United States Patent
Lines et al.

(10) Patent No.: US 6,817,408 B2
(45) Date of Patent: Nov. 16, 2004

(54) HEAT EXCHANGER WITH INTEGRAL INTERNAL TEMPERATURE SENSOR

(75) Inventors: James Richard Lines, Lancaster, NY (US); Alan Earl Smith, Batavia, NY (US); Lawrence Michael Saupe, Akron, NY (US); Lance Lee Frens, Byron, NY (US)

(73) Assignee: Graham Corporation, Batavia, NY (US)

( * ) Notice: Subject to any disclaimer, the term of this patent is extended or adjusted under 35 U.S.C. 154(b) by 242 days.

(21) Appl. No.: 10/010,269

(22) Filed: Dec. 6, 2001

(65) Prior Publication Data

US 2003/0205371 A1 Nov. 6, 2003

Related U.S. Application Data

(60) Provisional application No. 60/329,913, filed on Oct. 17, 2001.

(51) Int. Cl.[7] ................................................ G05B 23/00
(52) U.S. Cl. ........................ 165/299; 165/231; 62/139
(58) Field of Search ................................ 165/231, 233, 165/292, 299; 62/185, 80, 139

(56) References Cited

U.S. PATENT DOCUMENTS

| | | | |
|---|---|---|---|
| 2,071,728 A | | 2/1937 | Bursitxky |
| 2,160,389 A | * | 5/1939 | Palmer ........................ 62/59 |
| 2,349,671 A | * | 5/1944 | Newton ...................... 62/151 |
| 2,496,466 A | * | 2/1950 | Graham ...................... 62/201 |
| 2,713,994 A | * | 7/1955 | Angelery .................... 165/299 |
| 2,876,327 A | * | 3/1959 | Leisey ........................ 165/255 |
| 2,975,610 A | * | 3/1961 | Olson ......................... 62/139 |
| 3,267,688 A | * | 8/1966 | Carpigiani .................. 62/185 |
| 3,484,805 A | * | 12/1969 | Lorenz ....................... 62/139 |
| 3,653,221 A | * | 4/1972 | Angus ......................... 62/59 |
| 3,696,636 A | | 10/1972 | Mille |
| 4,027,821 A | * | 6/1977 | Hayes et al. ................ 126/588 |
| 4,201,262 A | | 5/1980 | Goldstein |
| 4,242,881 A | | 1/1981 | Williams |
| 4,416,323 A | * | 11/1983 | Evens ....................... 165/11.1 |
| 4,706,467 A | * | 11/1987 | Thorsen et al. .............. 62/139 |
| 4,800,729 A | * | 1/1989 | Hara .......................... 62/185 |
| 4,843,830 A | * | 7/1989 | Haul .......................... 62/59 |
| 4,850,201 A | * | 7/1989 | Oswalt et al. ................ 62/185 |
| 5,022,233 A | * | 6/1991 | Kirschner et al. ............ 62/138 |
| 5,261,482 A | * | 11/1993 | Lomax et al. ................ 165/10 |
| 5,435,379 A | * | 7/1995 | Moslehi et al. ............. 165/80.4 |
| 5,493,864 A | * | 2/1996 | Pomerene et al. ............ 62/3.7 |
| 5,653,106 A | * | 8/1997 | Katashiba et al. ..... 165/104.12 |
| 5,682,947 A | | 11/1997 | McFarlane |
| 6,003,595 A | * | 12/1999 | Watanabe .................... 165/299 |
| 6,044,903 A | * | 4/2000 | Heilman et al. ............. 165/263 |
| 6,047,767 A | | 4/2000 | Bodhaine et al. |
| 6,102,106 A | | 8/2000 | Manning et al. |
| 6,588,499 B1 | * | 7/2003 | Fahlsing ..................... 165/231 |

* cited by examiner

*Primary Examiner*—Terrell McKinnon
(74) *Attorney, Agent, or Firm*—Brian B. Shaw, Esq.; Roger Aceto, Esq.; Harter, Secrest & Emery LLP

(57) ABSTRACT

A heat exchange method and apparatus having a cooled fluid flowing in contact with a first surface of a heat exchange wall and a cooling fluid flowing in contact with a second surface of the wall. At least one temperature sensor is located to directly monitor the temperature of the first surface. Flow of the cooling fluid is throttled when the temperature of the first surface drops at least 50 degrees below the freezing temperature of the cooled fluid.

11 Claims, 2 Drawing Sheets

HEAT EXCHANGER WITH INTEGRAL INTERNAL TEMPERATURE SENSOR

This case claims priority of a Provisional Application Ser. No. 60/329,913 filed Oct. 17, 2001.

FIELD OF THE INVENTION

The present invention relates generally to a heat exchanger and more particularly to a heat exchanger having a temperature sensor for monitoring the temperature of the coolant passing in contact with the heat transfer surfaces of the heat exchanger.

BACKGROUND OF THE INVENTION

Many chemical reactions require close control of the reaction temperature. For example, in the pharmaceutical industry, it is not uncommon to use the batch method to prepare certain pharmaceuticals in a reactor vessel wherein the process temperature is as low as −150° F. (−100° C.) or even colder and down to temperatures as cold as −184° F. (−120° C.). Moreover, it is desirable to maintain the temperature of the reactor vessel within a narrow range and preferably at the lower end of the range so as to prolong the reaction time. Extending the batch reaction time provides a greater control over the reaction and an improvement in quality of the product. For example, if the acceptable range of the process temperature is (−100° F. to −150° F. −73° C. to −100° C.), each 18° F. (10° C.) decrease of the reaction temperature within this range can double the reaction time. Accordingly, a process temperature at the lower end of this range and as low as possible is preferred. Conversely, an increase of the temperature within the operating range speeds the reaction, decreases the quality of the materials produced and endangers the control over the reaction. There even is a danger of a runaway reaction should the temperature rise above the preferred range.

In order to maintain the proper operating temperature, the reactor vessel usually is jacketed. A low-temperature heat transfer fluid circulating through the jacket removes the exothermic heat of the reaction and heat gained from the surrounding environment. The heat transfer fluid in turn is circulated through an external heat exchanger in order to reject the heat gained during passage about the reactor vessel. Whereas a low-temperature heat transfer fluid is used for cooling the reactor vessel, a cryogen such as liquid nitrogen is used as the cooling fluid in the heat exchanger to remove heat from the low-temperature fluid heat transfer fluid.

Conventional practice is to measure the average or "bulk" temperature of the heat transfer fluid as it exits the heat exchanger. In response to this measure, adjustments are made by changing either the flow rate of the heat transfer fluid through the heat exchanger or by changing the flow rate of the cryogen. Relying upon the average outlet temperature of the heat transfer fluid (the "cooled fluid") to initiate flow changes has not been entirely satisfactory. This is because the temperature that is measured is merely the average temperature of the cooled fluid leaving the external heat exchanger and is not necessarily a correct indication of the cooling condition at the interface between the cooled fluid and the cryogen.

It should be appreciated that the temperature of the heat transfer surface in contact with the cooled fluid is actually below the freezing point of the cooled fluid, especially where a cryogen such as liquid nitrogen is used as the medium to remove heat from the cooled fluid. Accordingly, it is important to the operation of the heat exchanger that conditions be maintained so as to avoid the freezing of the cooled fluid onto the heat transfer surface. This is because there is a marked difference in the temperature of the heat transfer surface and the operation of the heat exchanger when the cooled fluid freezes onto the heat transfer surface.

For example, once the cooled fluid begins to freeze onto the heat transfer surface, there is a dramatic temperature change, due in part to the insulation properties of the ice collecting on the heat transfer surface. The build up of ice on the heat exchange surfaces also may restrict flow passages through the heat exchanger. The restriction of the flow passages and the insulation provided by the build up of an ice layer act to compromise the thermal efficiency of the heat exchanger. However, the decrease in the heat exchange capability may not be immediately recognized because the average or bulk temperature of the cooled fluid at the outlet to the heat exchanger still may be within acceptable limits. So long as the temperature sensor sees that the cooled fluid leaving the heat exchanger is at an acceptable level, no corrective measures are taken. Accordingly, relying on the bulk temperature of the cooled fluid delays the taking of corrective action.

Each one of various factors plays a roll in determining whether the cooled fluid begins to freeze onto the heat transfer surface. Among these are the geometry of the heat exchanger and the physical properties of the cooled fluid. Other factors affecting the onset of freezing include the velocity of the cooled fluid across the heat transfer surface, the turbulence of the boundary layer at the heat transfer surface and the thermal diffusivity of the cooled fluid. Also, a heat transfer fluid made of a single compound such as methanol may freeze quickly once a certain temperature is reached. Other fluids comprising a mixture of different organic isomers having different freezing points may not be compromised as quickly since one or more components of the mixture may remain fluid even while other components may freeze. Accordingly, in view of the many variables that may have an affect on the onset of freezing, it is difficult to predict whether a given cooled fluid will freeze under a given set of conditions. Once freezing begins, the temperature of the heat transfer surface may very quickly experience a decrease of from 50° to 100° F. (28° to 56° C.) or more and this decrease promotes further rapid freezing.

As noted above, the conventional method of relying on the bulk temperature of the cooled fluid leaving the heat exchanger is not reliable because the bulk temperature can remain within acceptable limits for some time after the onset of freezing. At some time however, a condition termed "runaway freeze-up" may occur, which results in a dramatic loss of heat rejection capability by the heat exchanger. Corrective action after the cooled fluid temperature goes beyond an acceptable limit usually takes the form of decreasing the flow of the cryogen until the ice build up on the coils is removed. Unfortunately during this period the ability of the low temperature heat transfer fluid to remove heat of the reaction from the reactor is compromised. Should the reactor temperature increase beyond acceptable limits, the pharmaceutical produced either is of a poorer quality or must be discarded.

Accordingly, it is an object of the present invention to provide a heat exchange method and apparatus for more accurately monitoring the thermal condition of a fluid being cooled by the heat exchanger.

Another object of the present invention is to provide a heat exchange method and apparatus wherein the thermal condition of a fluid being cooled is measured independently of the fluid itself.

Yet another object of the present invention is to provide a heat exchange method and apparatus wherein the thermal condition of a heat exchange fluid is controlled by monitoring the surface temperature of a heat exchange surface.

A further object of the invention is to provide a heat exchange method and apparatus for controlling the temperature of heat exchange fluid used in cooling a pharmaceutical reactor.

SUMMARY OF THE INVENTION

In accordance with the method of the present invention, a low temperature heat transfer fluid is circulated about a pharmaceutical reactor to remove the exothermic heat of the reaction and maintain the reactor vessel at a substantially constant temperature. The heat transfer fluid in turn is circulated through a heat exchanger where the heat of the reaction picked up by the fluid is released to a cooling fluid. In this respect the heat transfer fluid is circulated through a heat exchange apparatus and into contact with cooling coils within the heat exchanger. A cryogen such as liquid nitrogen circulates through the coils to remove the heat gained by the heat transfer fluid.

The temperature of the cryogen circulating through the cooling coil may be well below the freeing temperature of the heat transfer fluid (the "cooled fluid"). However, during operation it is important to prevent the cooled fluid from freezing onto the surface of the cooling coils. Generally, the heat exchanger design and operating parameters are selected to prevent freezing. However, as noted above, it is difficult to predict whether a given heat transfer fluid will freeze under a given set of conditions and the bulk temperature of the cooled fluid leaving the heat exchanger is not an accurate indicator of freezing at any given location within the heat exchanger.

Accordingly, in accordance with the present invention, a temperature sensor is located so as to monitor the temperature of the heat exchange surface itself rather than the temperature of the cooled fluid leaving the heat exchanger. Should the sensor detect a temperature indicating the cooled fluid is freezing onto the heat transfer surface, a signal is sent to throttle the flow of the cooling fluid (such as a cryogen). Decreasing the flow of the cooling fluid for a time allows the heat transfer surface to warm and cause the melting of any cooled fluid frozen onto the surface. In this way there is no substantial reduction of the heat rejection capacity of the heat exchanger and the flow of the cooled fluid through the exchange is in no way diminished. This is because the ice melting releases its heat of fusion as it rejects the heat that was picked up by the heat transfer fluid. The heat of fusion, plus reduced of cooling fluid, still is sufficient to remove heat from the low temperature heat transfer fluid.

When the temperature sensors see that the temperature of the heat transfer surface has risen to a point above the temperature where the cooled fluid might freeze, the flow of the cooling fluid is restored. In this fashion there is a proactive control of the cooling fluid to prevent or remove the ice build up onto the heat exchange surface rather than a reactive control responding to the temperature of the cooled fluid leaving the heat exchanger. Accordingly, the present invention may be characterized in one aspect thereof by a method of operating a heat exchanger including a heat transfer wall having a first surface and an opposite second surface comprising:

a) passing a cooled fluid in contact with the first surface of the heat transfer wall and passing a cooling fluid in contact with the second surface of the heat transfer wall;

b) directly monitoring the temperature of the first surface of the heat transfer wall; and c) adjusting the flow of one of the cooled fluid and cooling fluid in response to the temperature of the first surface to prevent the freezing of the cooled fluid onto the first surface of the heat transfer wall.

In another aspect, the present invention may be characterized by a heat exchange apparatus comprising:

a) a housing containing flow paths for a cooled fluid and a cooling fluid, the housing having a heat transfer wall with a first surface for contacting the cooled fluid and a second surface for contacting the cooling fluid;

b) means for directly monitoring the temperature of the first surface of the heat transfer wall; and c) means acting responsive to the temperature of the first surface for adjusting the flow of one of the cooled fluid and cooling fluid through the heat exchanger so as to prevent the freezing of the cooled fluid onto the heat exchange surface.

DETAILED DESCRIPTION OF THE PREFERRED EMBODIMENT

Figure 1:
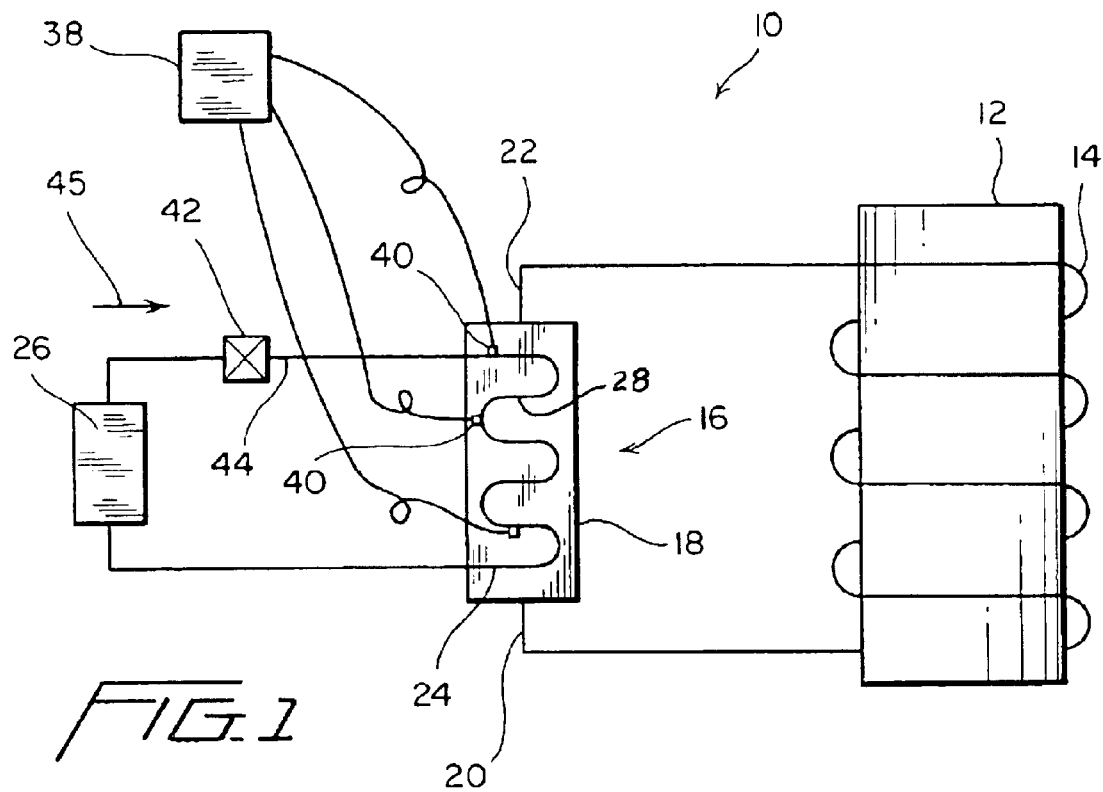
FIG. 1 is a schematic representation showing a heat exchanger method and apparatus of the present invention in association with a reactor vessel.

Referring to the drawings, FIG. 1 shows a heat exchange system generally indicated at 10 as may be used in pharmaceutical production. In this respect, the system includes a reactor vessel 12 for use in carrying out a batch reaction as is conventional in the production of pharmaceuticals. The reactor generally includes a jacket 14 for circulating a fluid about the vessel to remove exothermic heat and heat gained from the environment. For example, the fluid preferably is a low temperature heat transfer fluid such as an organic isomer or a mixture of isomers. Methanol, which has a freezing temperature of about −143.5° F. (−97.5° C.), sometimes is used although the demand is increasing for heat transfer fluids having even lower freezing points.

The flow path of the fluid carries it through a heat exchanger generally indicated at 16. In the heat exchanger, the exothermic heat of the reaction gained by the fluid is rejected and the fluid, now cooled, is circulated back through the coil 14.

Figure 2:
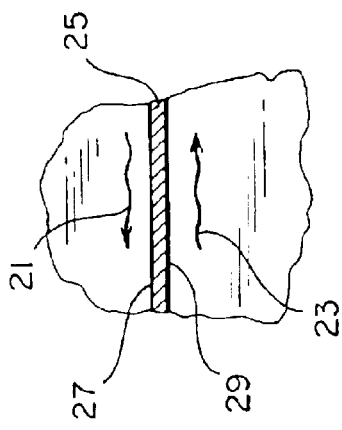
FIG. 2 is a view on an enlarged scale of a portion of FIG. 1.

The heat exchanger 16 includes a housing 18 having a fluid inlet 20 and a fluid outlet 22. Disposed within the housing is a heat transfer structure 24. The heat transfer structure can take any form that, as shown in FIG. 2, provides a heat transfer wall 25 having a first surface 27 for contacting a cooled fluid 21 and a second surface 29 for contacting a cooling fluid 23. Generally the heat transfer structure comprises one or more lengths of tubing for conducting the cooling fluid, the cooled fluid being circulated into contact with the skin or outer surface 27 of the tube. For purposes of illustration, the invention will be described in connection with a heat transfer structure 24 comprising one or more tubes 28 bent to form a cooling coil.

In this case, the tubing 28 comprising the coil (FIG. 3) has a tubular wall 25 having a first (outer) surface 27 in contact with the cooled fluid 21 and an inner (second) surface 29 in contact with the cooling fluid 23 flowing through the coil.

Figure 3:
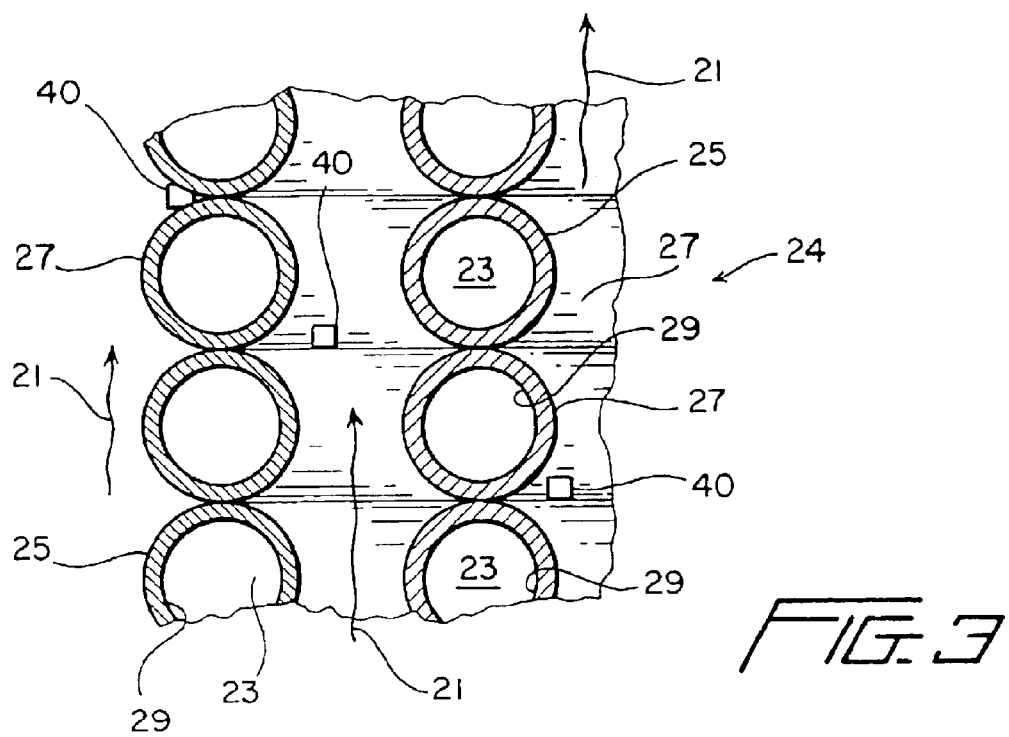
FIG. 3 is a cross sectional view showing a cooling coil embodying the present invention.

As shown in FIG. 1, cooling fluid from a source 26 flows through a flow line 44 and into the cooling coil 24 in the direction of arrow 45. The fluid to be cooled entering the housing at inlet 20 travels through the housing and into contact with the skin or outer surface 27 of the cooling coil (FIG. 3). The cooled fluid then exits the housing through outlet 22 and is circulated back to the jacket 14 about the reactor vessel 12. With this arrangement, the fluid to be cooled that is the hottest is first to contact the cooling coil 24 whereas the fluid to be cooled that is the coolest is last to contact the coil.

A controller 38 (FIG. 1) controls the flow of the cooling liquid through the cooling coil 24. The controller receives inputs from one or more temperature sensors 40 fixed at various locations to the exterior surface 27 of the tubes 28 making up the coil. The controller acts in response to the input signals to operate the throttling valve 42 in the cooing liquid flow line 44.

The temperature sensors 40 are placed directly against exterior surface 27 of the tube 28 at a plurality of locations along the length of the coil in order to monitor the temperature of the cooling coil exterior surface at various locations along the flow path taken by the cooled liquid. The temperature sensors are connected to the controller 38 that is programmed to operate the throttling valve in response to any one of the sensors indicating that a preset low temperature has been reached. While only one sensor is required in some cases, it is preferred that more than one sensor be used. The number of sensors to be used depends, among other factors, upon the type of cooled fluid that is used, the velocity of the flow of the cooled fluid and the temperature differential between the cooled fluid and the cryogen.

In operation, the heat transfer fluid, heated by the exothermic reaction within the reactor vessel 12 enters the inlet 20 of the heat exchanger 16. This heat is given up as the cooled fluid flows in contact with the exterior surface 27 of the cooling coil so the temperature of the cooled fluid leaving the heat exchanger is cooler than the temperature entering the heat exchanger. This difference represents the exothermic heat generated by the reaction in vessel 12, plus heat gain from the surrounding environment that was gained by the cooled fluid.

The flow of cooling fluid through the coil is maintained at a relatively constant until such time as a temperature sensor 40 indicates the onset of freezing onto the coil outer surface 27. When this occurs, the controller 38 10 acts to throttle the flow of the cryogen. Decreasing the flow of the cryogen allows the temperature of the coil outer surface to rise and causing the accumulated ice layer to melt.

Upon detection of the warmer temperature, the controller restores the flow of the cryogen. In this fashion the build up of ice onto the coil surface is prevented in a proactive manner so the operation of the heat exchanger is not compromised.

A testing arrangement using a plurality of temperature sensors 40 arranged along the length of the cooling coil can demonstrate parameters of the present invention. The test results are illustrated in a series of curves shown in the graph of FIG. 4.

Figure 4:
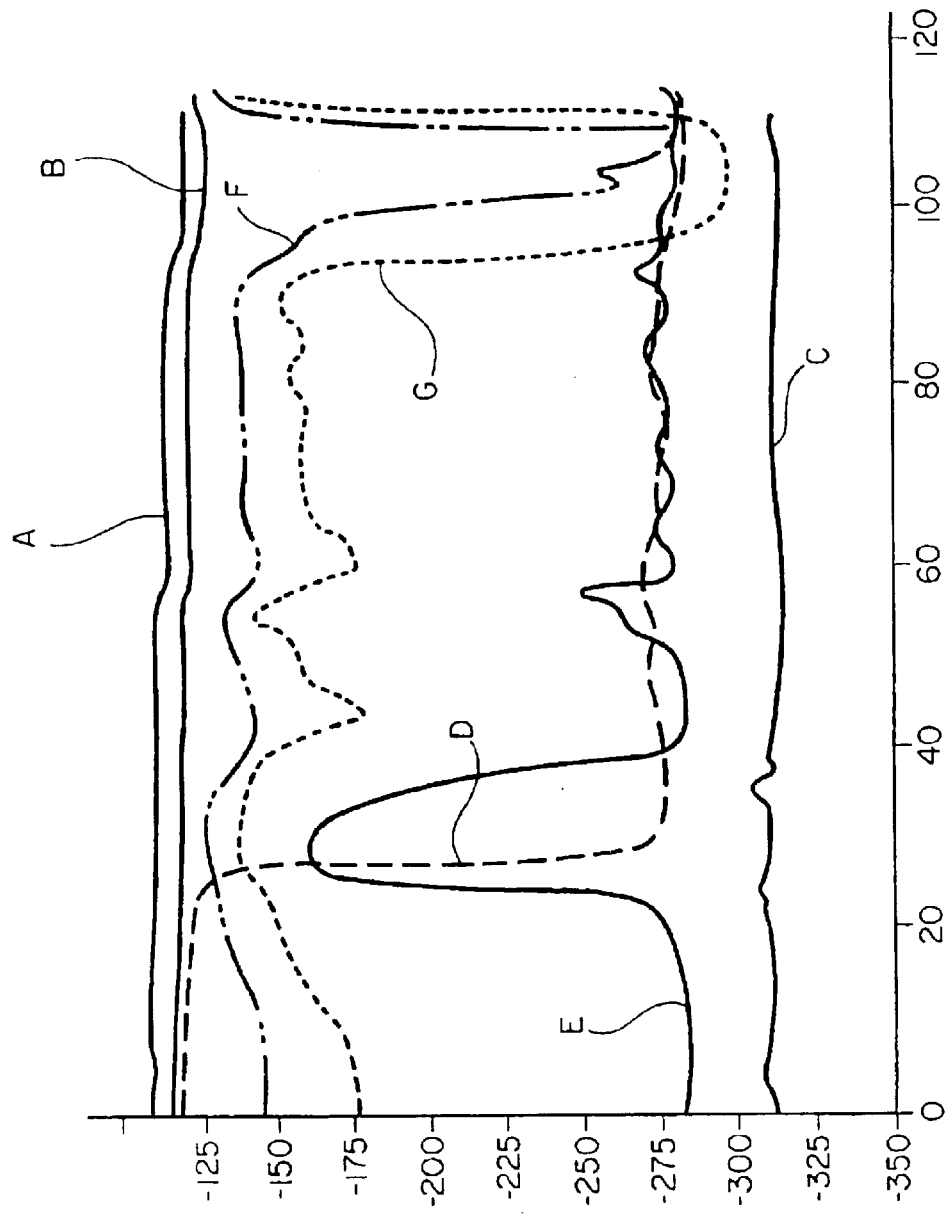
FIG. 4 is series of curves showing the temperature of a heat transfer surface over time.

FIG. 4 is a series of curves showing several time/temperature plots illustrating the operation of the present invention. In this respect, the graph shows curves A and B which represent the temperature, over time, of both the inlet and outlet temperatures respectively of the heat transfer fluid. For purposes of example, the heat transfer fluid in this case is an organic isomer such as methanol having a freezing temperature of about −143.5° F. (−97.5° C.). The difference between the methanol inlet and outlet temperatures is about 4 to 8° F. This difference represents the exothermic heat of the reaction released in the heat exchanger.

FIG. 4 also shows a curve C plotting the inlet temperature of a cryogen, such as liquid nitrogen, entering the heat exchanger. This temperature remains at a temperature lower than about −310° F. for the duration of the test. This temperature represents the lowest temperature possible for the heat transfer surface 27 contacted by the heat transfer fluid.

Also shown in FIG. 4 are four curves D, E, F and G showing temperature measurements, over time, taken by temperature sensors 40, such as thermocouples, fixed to the skin or outer surface 27 of the cooling coil at various locations along the length of the heat transfer surface from adjacent the inlet 20 (curve D) to adjacent the outlet 22 (curve G). For purposes of the test only the temperature sensor as represented by curve F was used to control the flow of the cryogen.

It is important for purposes of the present invention that the control 38 operating the throttling valve 42 be set to operate when a temperature sensor 40 indicates a temperature well below the freezing temperature of the cooled fluid. As noted above, this is because freezing of the heat transfer fluid may not occur even though the temperature of the heat transfer surface 27 is below the freezing temperature of the cooled fluid.

The temperature/time curve labeled "G" illustrates this condition. Curve G shows the temperature at one particular sensor fixed to the heat transfer surface as tracking in a temperature range below −150° F. and as low as −175° F. or some 30 degrees below the freezing temperature of the methanol. Even at these low temperatures the methanol remains fluid for over ninety minutes of operation. However, once freezing does start, the accumulation of ice onto the heat transfer surface drops the heat transfer surface temperature by over 125 degrees or to about −300° F. in a matter of minutes. This is because the ice accumulating on the heat transfer surface and over the temperature sensor insulates the sensor from the heat transfer fluid so the sensed temperature quickly approaches the temperature of the cryogen.

Thus, curve G shows that a controller set to react at the freezing temperature of the cooled fluid or at some temperature only a few degrees below the freezing temperature of the cooled fluid may react well before any actual freezing occurs. The result would be the premature throttling flow of the cryogen. Accordingly, for proper operation of the present invention, the controller 38 must be programmed to react when the sensed temperature is well below the freezing temperature of the heat transfer fluid. Preferably, the controller is set to react when the temperature of the heat transfer surface is at least 50 degrees or more below the freezing temperature of the cooled fluid and preferably when it is within 50 to 75° F. (28 to 42° C.) of the cooling fluid.

Curve D illustrates the temperature at a location along the coil closest to the inlet 20 of the heat exchanger and upstream of the sensor for Curve F. Curve D shows the temperature of heat transfer surface dropping some 150 degrees in about two minutes or less indicating that the cooled fluid was freezing onto the heat transfer surface. The freezing condition remained for the duration of the test.

Curve E shows the temperature of the heat transfer surface monitored by a sensor at a location further along the coil and downstream from the sensor for curve D. The sensor indicates a surface temperature at time zero of below −275° F. A spike in temperature occurs from about 25 to 40 minutes and then the temperature returns to sub −275° F. temperatures for the duration of the test. It is believed that the spike in temperature is caused by the ice layer so narrowing the flow path for the cooled fluid that an increase in the velocity of flow results. Increasing the velocity of flow in turn improves heat transfer properties, which causes the ice to melt and allowing the temperature of the heat transfer surface to increase. However, as shown by curve E, the thaw is short lived and the heat transfer surface once again falls well below the freezing temperature of the cooled fluid and remains at about −275° F. for the duration of the test.

It should be noted that even with the sensors for curves D, E and G indicating ice forming conditions at three locations along the length of the cooling coil, the freezing of the cooled fluid is not yet manifest in a drastic change of the outlet temperature of the cooled fluid (curve B). However, if uncorrected, the freezing eventually will cause a spike in the outlet temperature of the cooled fluid. Reacting to this spike in the temperature of the cooled fluid introduces a corrective measure only after the freezing conditions have compromised the heat transfer properties of the heat exchanger. Such a delay in taking corrective action may result in an adverse affect on the operation of the pharmaceutical process.

The improvement offered by the present invention is illustrated by curve F in FIG. 4. This curve represents the temperature of the heat exchange surface at a location between the sensors for E and G. As noted above, in the test, the sensor used for generating the temperatures of curve F was the only sensor connected to the controller 38. Curve F shows that the temperature of the heat transfer surface tracked between about −125° F. and −150° F. 150° F. for about 100 minutes of operation. The sudden drop of some 125 degrees in the next few minutes is a clear indication that the cooled fluid was freezing onto the heat transfer surface. The controller 38, in response to this precipitous temperature change was programmed to throttle the flow of the cryogen.

As curve F demonstrates, throttling the cryogen flow (and subjecting the heat transfer surface to less cooling) caused the rapid melting of any ice formation. This allowed the heat transfer surface to very quickly rise back to the previous tracking range of −125° F. to −150° F. The restoration of the tracking range occurred in a minute or less after throttling the cryogen flow. Thereafter, when the sensor 40 sees an increase in temperature of the tube exterior surface to within 50 degrees of the cooled fluid freezing temperature, the controller 38 operates to reestablish the flow of the cryogen.

Thus, the present invention provides a proactive response to the onset of freezing. Being proactive prevents the ill effects as may be caused by a failure to recognize that freezing conditions are present until after the temperature of the cooled fluid increases beyond acceptable limits. Moreover, throttling the flow of the cooling fluid for short periods does not adversely affect the heat rejection capability with the heat exchanger so the batch reaction temperature remains relatively constant throughout the duration of the batch reaction.

While any number of temperature sensors may be used, a single sensor located adjacent the outlet 22 is sufficient for purposes of the present invention. Regardless of the cooled fluid that is used, it is important that the controller 38 be set to initiate operation of the throttling valve when the heat transfer surface reaches a temperature well below the freezing temperature of the cooled fluid. For example, for purposes of the present invention the triggering temperature should be at least 50 degrees below the cooled fluid freezing temperature and preferably at least 150 degrees or more below the cooled fluid freezing temperature or within 50 to 75 degrees of the temperature of the cryogen. As noted above, setting the triggering temperature at or close to the freezing temperature of the cooled fluid is ineffective to determine the onset of freezing.

Accordingly, it should be appreciated that the present invention accomplishes its intended objects. Monitoring the temperature of the heat transfer surface allows the controller to change the flow of the cooling liquid so as to prevent the freezing of the cooled fluid onto the heat exchange surface. Monitoring the temperature of the heat exchange surface rather than the exit temperature of the cooled fluid allows for a proactive response to correct for a decrease in the heat exchange capacity of the heat exchanger caused by the freezing of the cooled fluid onto the heat exchange coils.

While the invention has been described in connection with changing the flow of the cooling fluid in response to an onset of freezing, it also is possible correct the freezing condition by changing the flow of the cooled fluid. Also, while it is preferred that triggering a flow change occurs in response to a predetermined temperature decrease, the triggering event also could be the rate at which the temperature decreases. As demonstrated by the curves of FIG. 4, the temperature drops at a very rapid rate once freezing begins. The controller then can be set to initiate operation of the throttling valve upon recognition of a predetermined rate of change indicative of the onset of freezing.

Having described the invention in detail, what is claimed as new is:

1. A method of operating a heat exchanger including a heat transfer wall having a first surface and an opposite second surface comprising:
    a) passing a cooled fluid in contact with the first surface of the heat transfer wall and passing a cooling fluid in contact with the second surface of the heat transfer wall;
    b) directly monitoring the temperature of the first surface of the heat transfer wall; and
    c) adjusting the flow of the cooling fluid in response to the temperature of the first surface falling to a level at least 50 degrees below the freezing temperature of the cooled fluid.

2. A method as in claim 1 wherein the cooling fluid is a cryogen and adjusting the flow comprises decreasing the flow of the cryogen when the temperature of the heat transfer surface falls to at least 50 degrees below the freezing temperature of the cooled fluid.

3. A method as in claim 1 wherein the cooled fluid is an organic having a freezing temperature of at least −143.5° F., the cooling fluid is a cryogen and adjusting the flow comprises reducing the flow of the cryogen when the temperature of the first surface falls at least 50 degrees below the freezing temperature of the organic.

4. A method as in claim 1 wherein the cooling fluid is a cryogen and adjusting the flow comprises reducing the flow of the cryogen when the temperature of the first surface falls to within 50 to 75 degrees of the temperature of the cryogen.

5. A method of operating a heat exchanger including a heat transfer wall having a first surface and an opposite second surface comprising:

a) passing a cooled fluid comprising an organic in contact with the first surface of the heat transfer wall and passing a cooling fluid in contact with the second surface of the heat transfer wall;

b) directly monitoring the temperature of the first surface of the heat transfer wall; and c) adjusting the flow of one of the cooled fluid and cooling fluid when the temperature of the first surface falls to a level at least 50 degrees below the freezing temperature of the organic.

6. A method of operating a heat exchanger encompassing a tube wall having inner and outer surfaces, comprising:

a) flowing a cooling fluid through the tube and in heat exchange contact with the inner surface of the tube wall at a first flow rate;

b) passing a cooled fluid in heat exchange contact with the outer surface of the tube wall;

c) measuring the temperature of the outer surface of the tube wall; and d) decreasing the flow of the cooling fluid to a second flow rate in response to the temperature of the outer surface falling at least 50 degrees below the freezing temperature of the cooled fluid to prevent the freezing of the cooled fluid onto the outer surface.

7. A method as in claim 6 comprising restoring the first flow rate upon the temperature of the outer surface increasing to within 50 degrees of the freezing temperature of the cooled fluid.

8. A method as in claim 6 wherein the cooling fluid is a cryogen and decreasing the flow of the cryogen occurs when the temperature of the outer surface falls to within 50 to 75 degrees of the temperature of the cryogen.

9. A heat exchange apparatus comprising:

a) a housing containing flow paths for a cooled fluid and a cooling fluid, the housing having a heat transfer wall with a first surface for contacting the cooled fluid and a second surface for contacting the cooling fluid;

b) monitoring means for directly monitoring the temperature of the first surface of the heat transfer wall; and c) adjusting means acting responsive to the temperature of the first surface that is at least 50 degrees below the freezing temperature of the cooled fluid for adjusting the flow of one of the cooled fluid and cooling fluid through the heat exchanger so as to prevent the freezing of the cooled fluid onto the first surface.

10. Apparatus as in claim 9 wherein the monitoring means comprises at least one thermocouple attached directly to the first surface.

11. Apparatus as in claim 9 wherein the cooling fluid is a cryogen and the adjusting means acts in response to a temperature of the first surface that is within 50 to 75 degrees of the temperature of the cryogen.

* * * * *